United States Patent [19]

Phillips

[11] 4,369,559
[45] Jan. 25, 1983

[54] METHOD OF CONVERTING A SPORTS CAR TO A REPRODUCTION OF A VINTAGE MOTOR CAR

[76] Inventor: Charles W. Phillips, 1519 SW. 6 Ter., Boca Raton, Fla. 33432

[21] Appl. No.: 175,640

[22] Filed: Aug. 6, 1980

[51] Int. Cl.³ ..................... B23P 17/00; B60R 27/00
[52] U.S. Cl. .................... 29/401.1; 29/428; 180/291; 180/312; 296/185
[58] Field of Search ............. 180/313, 312, 311, 54 R, 180/291, 292, 208, 209; 296/197, 196, 185, 26; 29/401.1, 416, 428

[56] References Cited

U.S. PATENT DOCUMENTS

| | | | |
|---|---|---|---|
| 1,310,425 | 7/1919 | McIntyre | 296/26 |
| 2,139,750 | 12/1938 | Hicks | 296/185 |
| 4,099,313 | 7/1978 | Phillips | 296/185 X |

FOREIGN PATENT DOCUMENTS 365929  1/1932  United Kingdom ................ 296/26

*Primary Examiner*—Joseph F. Peters, Jr.
*Assistant Examiner*—Milton L. Smith
*Attorney, Agent, or Firm*—Remy J. VanOphen

[57] ABSTRACT

A conventional production car is converted to a reproduction of asa vintage car by severing the frame of the production car near the firewall. Longitudinal extension segments are welded to each end of the severed frame to lengthen the wheelbase and the engine compartment. The radiator, emission canister, radiator overflow bottle, and windshield washer bottle are relocated in the engine compartment. The engine is mounted on a cross member which extends from one longitudinal extension segment to the other. Vintage outer body panels, vintage grille, vintage wheels and vintage door panels are secured to the frame to provide a reproduction of a vintage car.

15 Claims, 18 Drawing Figures

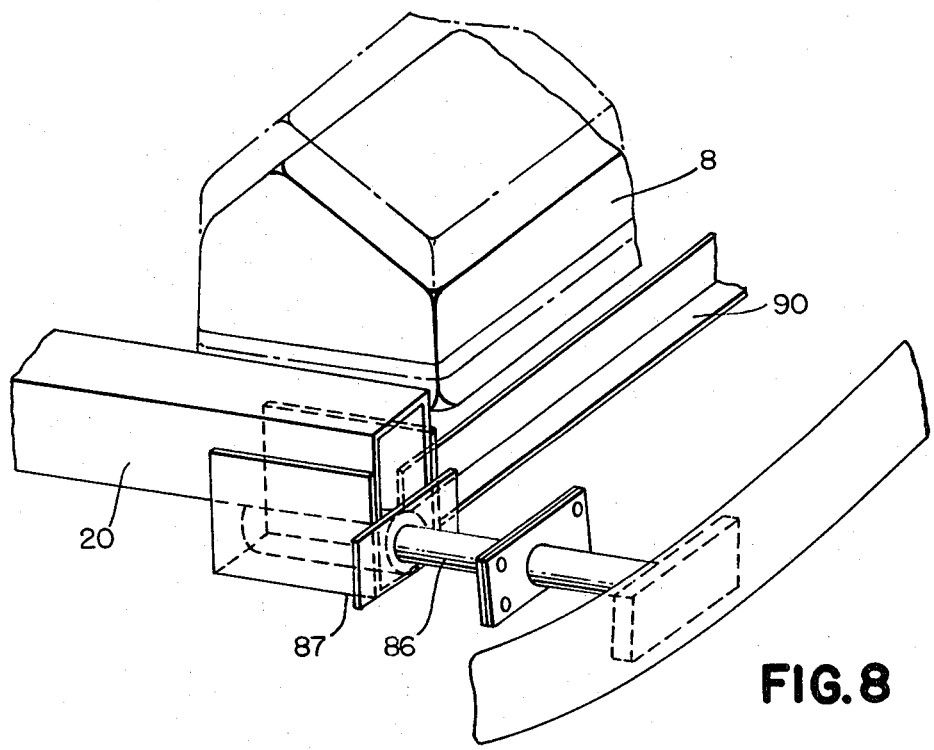
FIG. 8
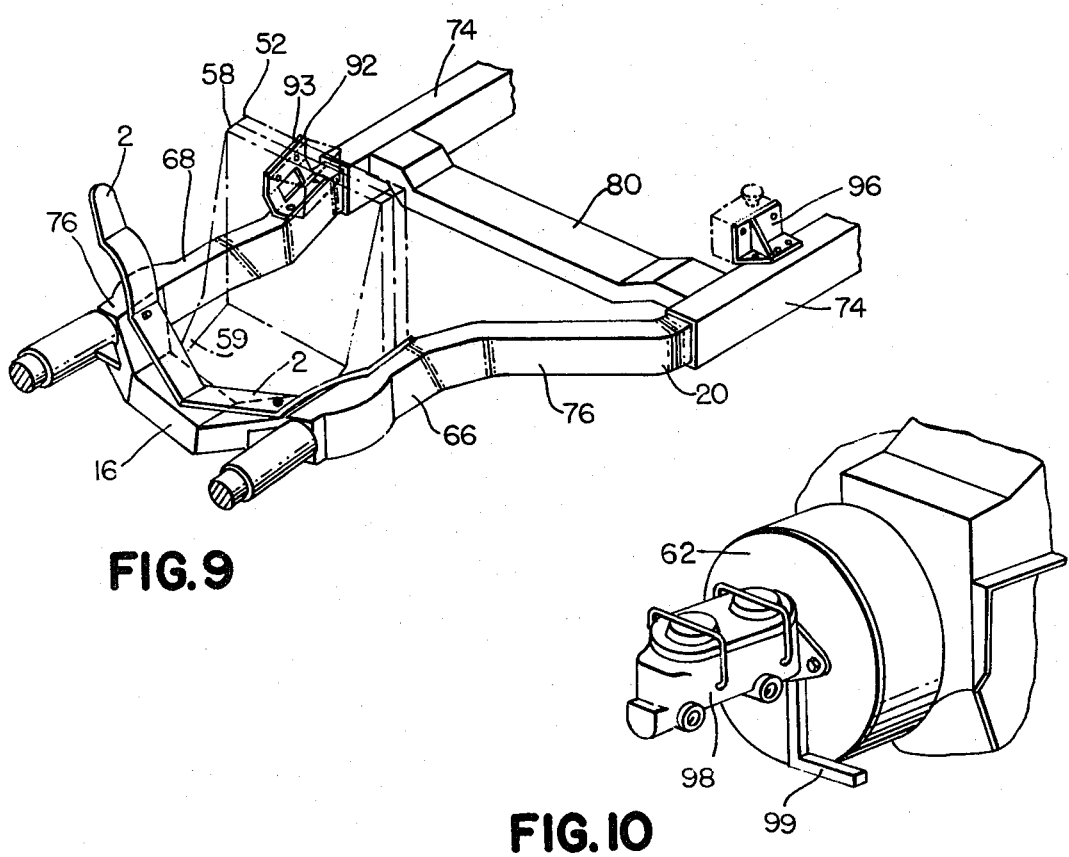
FIG. 9
FIG. 10

METHOD OF CONVERTING A SPORTS CAR TO A REPRODUCTION OF A VINTAGE MOTOR CAR

FIELD OF THE INVENTION

This invention relates to a self-propelled motor vehicle and, more particularly to a method for converting such motor vehicle to a reproduction of a vintage motor car for passenger transportation.

BACKGROUND OF THE INVENTION

Because of the need to reduce unit costs, the automotive industry has been reluctant to proliferate the number of body styles and configurations on their vehicle frames. Therefore, none of the major automotive companies offer reproduction of vintage styled motor cars which were popular many years ago. Thus, consumers seeking distinctive body styles similar to those of vintage classic cars, have had to modify their existing vehicles themselves.

There are several known prior art patents which concern the conversion of van-type vehicles with various attachments to the vehicle body in order to make the van more versatile for special occasions. For example, the patents to Lee, U.S. Pat. No. 3,741,605, issued on June 26, 1973; Frank, U.S. Pat. No. 3,501,194 issued Mar. 17, 1970 and Persico, U.S. Pat. No. 3,905,638 issued Sept. 16, 1975. In Lieffring, U.S. Pat. No. 3,730,582 issued on May 1, 1973, the front end portion of a 1970 Volkswagen is modified and provided with an curved hood extending outwardly and downwardly in order to substantially change the appearance of the automobile. This conversion, however, is limited to modifying the front end of the vehicle only. Thomson, U.S. Pat. No. 3,550,948 issued on Dec. 29, 1970, teaches a unitary body construction consisting of three shell portions which define the vehicle body as well as the chassis frame. This eliminates the need for metallic parts and, therefore, a corrosion resistant material covering the three shell portions eliminates rust in the resulting structure. Thompson, however, does not provide a distinctive vintage classic car reproduction appearance. Schweser, U.S. Pat. No. 3,409,323 issued Nov. 5, 1968, teaches a one piece insert body construction of a modified plastic reinforced fiberglass material. Schweser also teaches that the body may be of a one piece integral metal construction for a roadster vehicle shell body. The insert is secured to the roadster shell body along its frame with rivets or snap fasteners. The insert, as well as roadster shell body, may be reinforced by having foam of suitable weights or fiberglass or a mixture of both blown therebetween, thereby reconverting the assembled insert body and roadster shell body into a one piece unit. Schweser, however, is limited to a roadster vehicle configuration. None of the aforesaid conversion vehicle patents provide a distinctive vintage classic car reproduction.

In Phillips, U.S. Pat. No. 4,099,313 issued July 11, 1978, a conventional sedan is converted into a car with a lengthened engine compartment and a body which is correspondingly shortened immediately behind the door posts. Longitudinal sections of the frame below the car body behind the door posts are removed and welded to the frame at the engine compartment. Corresponding sections are removed from the roof, floor and drive shaft tunnel immediately behind the door posts to divide the car body into front and rear sections after which these sections are welded back together to provide the converted shortened body. This method of converting a motor car provides a restyled conventional sedan which has distinctive appearance, however, it does not provide the distinctiveness associated with a vintage styled motor car reproduction.

In summary, none of the above-identified patents provide a conversion process to transform an existing sports car into a distinctly styled vehicle having a configuration similar to a vintage motor car reproduction.

SUMMARY OF THE INVENTION

The present invention provides a method of converting a production car into a vintage reproduction of a classic car to provide a distinctive appearing vehicle.

The present invention provides a method of converting a sports car to provide a lengthened engine compartment and lengthened wheel base so as to form a reproduction of a vintage car. The conversion method involves removing the engine compartment hood, the front fenders, and the front and rear body sections from the frame of the sports car. Next, the frame is severed transversely at the engine compartment and the severed rear and front sections of the frame are longitudinally separated. Two longitudinal frame segments are inserted between the separated sections of the frame at the engine compartment and the inserted longitudinal frame segments are joined at each end to the adjoining sections of the frame. Next, the engine is mounted on the two longitudinal frame segments at the engine compartment and a vintage style body, an elongated engine compartment hood and front and rear fenders are attached to the frame of the sports car.

A principle object of this invention is to provide a method of converting a conventional sports car to provide a lengthened engine compartment and wheel base so as to form a reproduction of a vintage body styled motor car.

Another object of this invention is to provide a method of forming a reproduction of a vintage body styled motor car without having to modify the existing drive train components.

A still further object of this invention is to provide a method of converting a conventional production sports car to a reproduction of a vintage body styled car with a lengthened wheel base to provide greater road stability for the vehicle.

Further objects and advantages of this invention will be apparent from the following detailed description of the preferred embodiment as shown in the accompanying drawings.

BRIEF DESCRIPTION OF THE DRAWINGS

FIG. 8 is a partial perspective view of the modified rear shock absorber mounted to the frame and the gas tank relocated in accordance with the present invention;

FIG. 9 is a partial perspective view of the engine compartment and frame with engine removed showing the modified front shock absorbers mounted to the frame, front fender support brackets mounted to the frame and the longitudinal extension segments and cross member welded to the frame in accordance with the present invention;

FIG. 10 is a perspective view of a speed control mounting bracket assembled to the brake master cylinder;

DESCRIPTION OF THE PREFERRED EMBODIMENT

Figure 1:
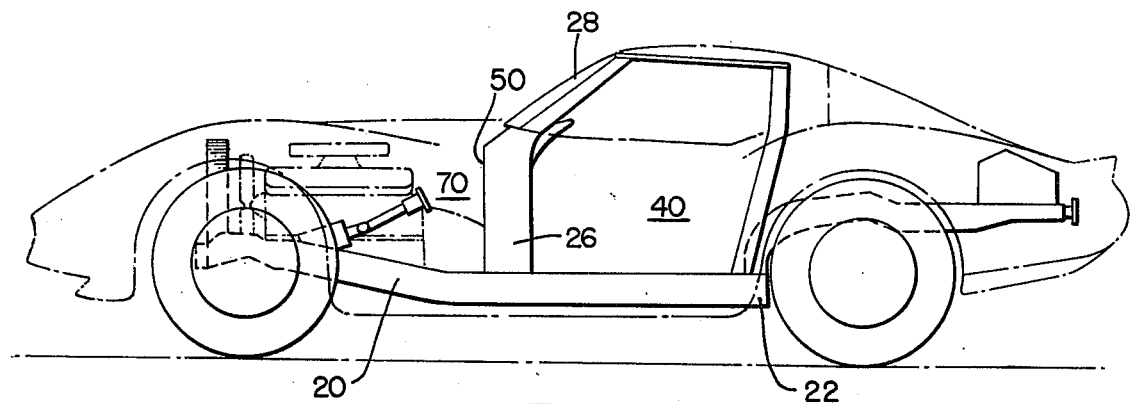
FIG. 1 is a side view of a Chevrolet "Corvette" two-door sports car with a production frame, engine, transmission, gas tank, firewall and windshield shown prior to modification in accordance with the present invention and also showing the removed production outer body panels in phantom.

FIG. 1 shows the frame and body of a 1980 Chevrolet "Corvette" sports car which has its front and rear body sections (shown in phantom) removed so as to be converted into a reproduction of a classic vintage car. Those skilled in the art will recognize that the Chevrolet "Corvette" sports car is the only production fiberglass body sports car built in North America. However, those skilled in the art will recognize that any similar car may be used for the conversion purposes of this invention after reading this disclosure. By way of nonlimiting example, the vintage classic car reproduction of the preferred embodiment of this invention is a full fendered 1934-38 540K Mercedes-Benz automobile. The invention herein described, however, is not limited to the 1934-38 540K Mercedes-Benz outer body configuration since with well known body section surface changes my invention may be practiced to reproduce other vintage vehicle outer body configurations.

Figure 2:
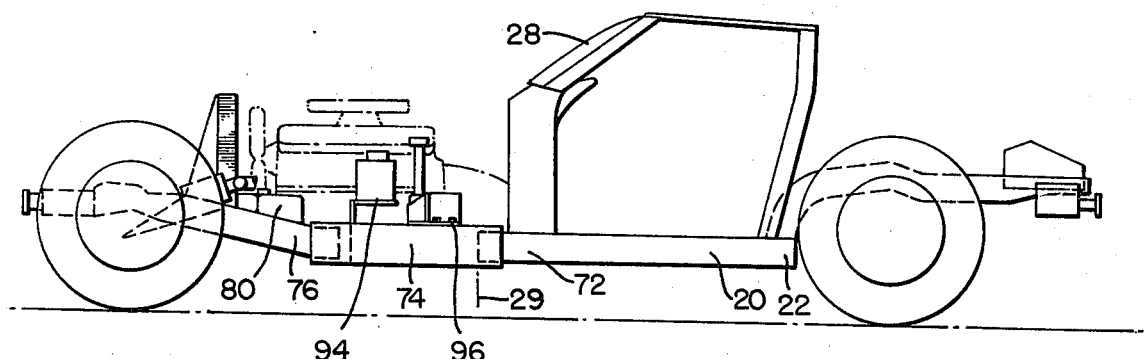
FIG. 2 is a side view of the sports car showing the frame after it has been transversely severed and a longitudinal extension segment welded to the frame in the engine compartment as well as several modified components relocated on the frame.
Figure 3:
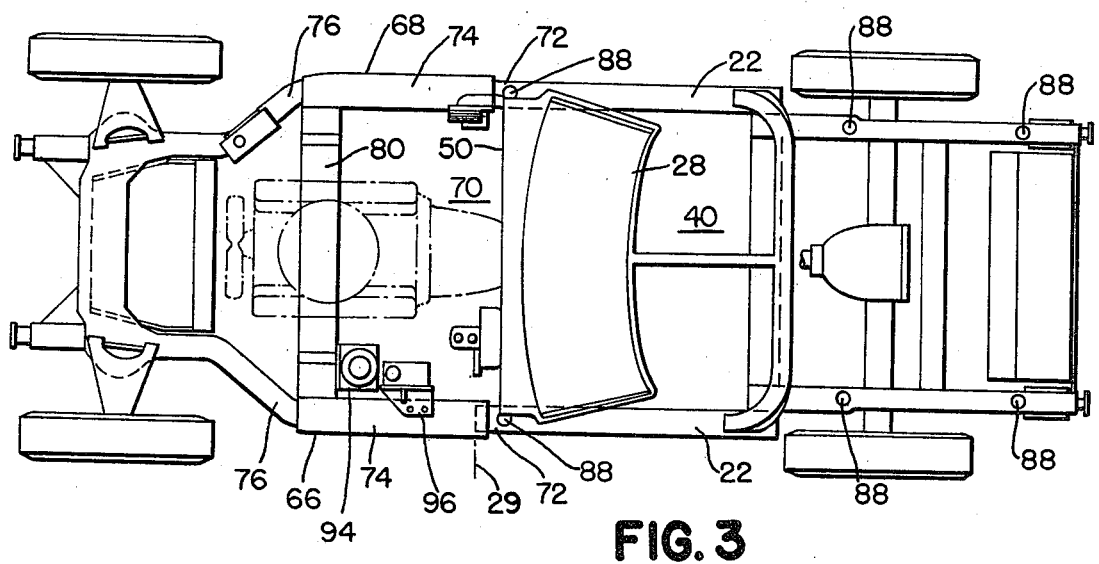
FIG. 3 is a top view of FIG. 2.

The 1980 "Corvette" has a frame 20 with opposite longitudinal side pieces 22 below the passenger compartment and horizontal cross pieces extending between the opposite longitudinal side pieces 22 as is shown in FIGS. 1 through 3. The frame has door posts 26 on each side of the frame which extend vertically from the frame 20 along the firewall 50 to the windshield 28. The firewall 50 separates the passenger compartment 40 from the engine compartment 70. From the passenger compartment 40, the two seats (not shown) are removed as well as all the interior decorative trim. Next, the "Corvette" front and rear body sections are removed and the mounting flanges on the frame 20 are trimmed to accept the outer vintage vehicle body panels as will be described later herein.

Figure 4:
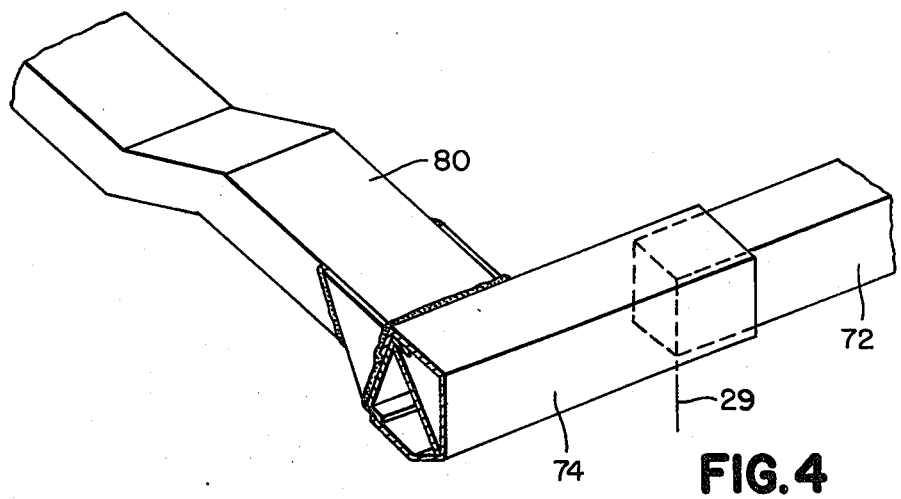
FIG. 4 is a perspective view of the frame after the frame has been transversely severed and a longitudinal extension segment and cross member welded to the frame at the engine compartment further showing a partial cross section of the longitudinal extension segment.

The stripped vehicle is then placed on a frame jig and the opposite longitudinal side pieces, which project forward from the firewall 50 into the engine compartment 70, are severed at phantom line 29 as shown in FIGS. 2, 3 and 4 by conventional devices such as flame cutters or sawtooth cutters or any other suitable device. Thus, the opposite longitudinal side pieces form two sections, a forward section 76 and a rear section 72 adjacent to the firewall 50. A pair of three piece longitudinal extension segments 74 are joined to the longitudinal rear section 72 and the forward section 76 one on each side by conventional means, such as welding. The frame of the engine compartment is thus lengthened by the three-piece longitudinal extension segment 74 which is inserted between the forward section 76 and the rear section 72. Thus, the wheel base of the vehicle and the engine compartment are lengthened. In the preferred embodiment, by way of nonlimiting example, the wheel base is lengthened 22 inches. Those skilled in the art will recognize that the wheel base of the vehicle can be shortened or lengthened to any appropriate size to accommodate other vintage car body configurations as required to reproduce any other vintage car. A cross member 80 is fastened on each end to each of the opposite longitudinal extension segments 74 to provide a mount for the engine thereon. The engine is fastened to the cross member by conventional means such as resilient mounting members and fasteners well known in the prior art.

Figure 5:
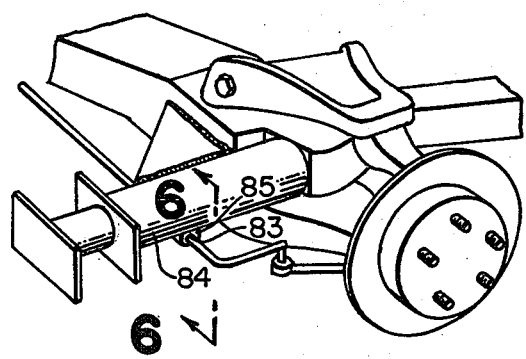
FIG. 5 is a partial perspective view of the modified front shock absorber mounted to the frame.
Figure 6:
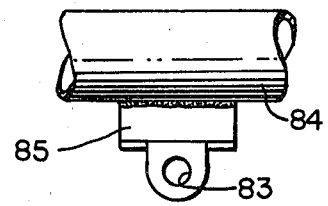
FIG. 6 is a side view of the modified front shock absorber.

The bumper shock tube from the front of the production sports car is removed and modified by providing the lower edge of the front bumper shock tube 84 with a support gusset 85 as shown in FIG. 6. The support gusset 85 has a hole 83 drilled therethrough so that when the front bumper shock tube 84 is fastened to the front of the frame near the front wheel suspension, the front stabilizer bar passes through the hole 83 in the support gusset 85 as is shown in FIG. 5.

The rear cross member 90 of the prior art sports car is removed and relocated, by way of nonlimiting example, 3 inches vertically downward to permit mounting of the rear bumper shock tubes 86 to the rear cross member 90 as shown in FIG. 8. The rear bumper shock tubes 86 are modified with a shock mounting bracket 87 which attaches to the rear cross member 90 and the frame 20. The production gas tank 8 is also relocated vertically downward into the frame 20. In the preferred embodiment, by way of nonlimiting example, the gas tank is lowered 3 inches to permit mounting of the vintage outer body panels to the frame 20 as will be described later herein.

Figure 7:
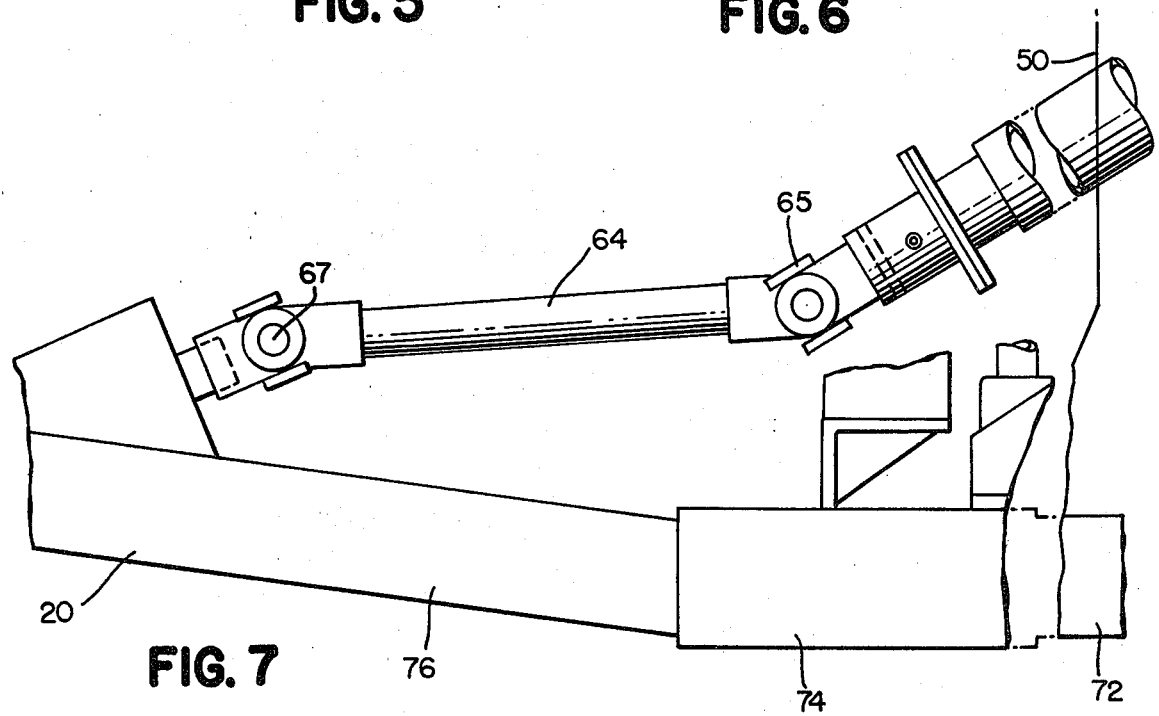
FIG. 7 is a side view of the extension steering shaft assembly.

Since the wheel base of the vehicle has been extended with the insertion of the three piece opposite longitudinal extension segment 74 to the frame 20, it has been found necessary to insert a steering shaft extension 64 and a coupling 65. The steering shaft extension 64 and the coupling 65 connect to the existing coupling 67 of the "Corvette" steering gear box which remains mounted to the forward section 76 of the frame 20 and the steering shaft extension as shown in FIG. 7. The steering shaft extension protrudes through the firewall 50. The coupling 65 is attached to the sports car steering shaft extension by conventional fastener means such as pins. The coupling 65 thus aligns the sports car steering box with the steering shaft to facilitate mounting the steering shaft extension 64 between the two couplings. The steering shaft extension 64 and the coupling 65 also permits the location of the engine in the engine compartment without any structural changes required to the frame and relocation of any major engine accessories.

A plurality of body spacers 88 are attached to the sports car frame 20 as shown in FIGS. 2 and 3. The body spacers vertically raise the attachment points of the vintage vehicle body outer panels to the frame. In the preferred embodiment, six body spacers 88 vertically raise the attachment points 2 inches relative to the frame 20. Those skilled in the art will recognize that any number of spacers may be used and that the spacers may be of any desired length in order to accommodate various other outer body panel configurations.

Next, various engine compartment components are relocated in the engine compartment such as a radiator overflow bottle 92, a emission canister 94, a windshield washer bottle 96, and a speed control 98 as shown in FIGS. 2, 3, 9 and 10. The radiator overflow bottle 92 is attached on a mounting bracket 93 by conventional means and both are then relocated on the right hand side 68 of the engine compartment and mounted to the frame 20. The emission canister 94 is relocated from the sports car so as to be adjacent to the left hand side 66 of the engine compartment 70 and mounted to the cross member 80. The windshield washer bottle 96 is attached to a mounting bracket 97 which is then mounted to the three piece opposite longitudinal extension segment 74 adjacent to the emission canister 94. The speed control 98 is attached to a mounting bracket 99 which is then mounted to lower boss (not shown) on the brake master cylinder 62.

Figure 11:
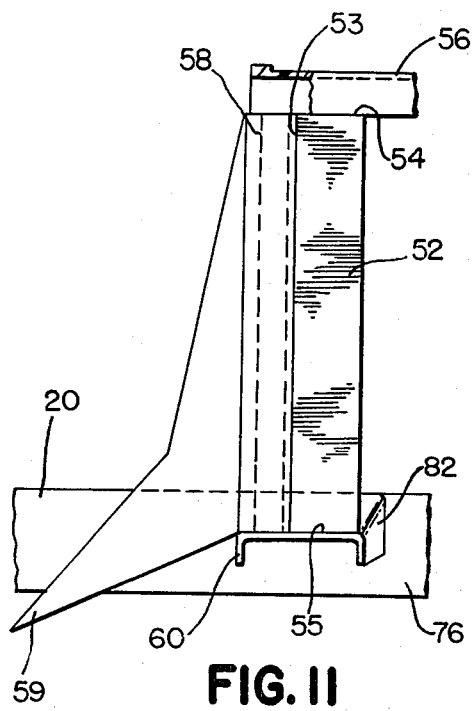
FIG. 11 is a side view of the relocated radiator and condenser mounted to the frame showing the mounting of the modified air duct to the carburetor and the air scoop to the radiator in accordance to the present invention.

Because the engine compartment 70 is now elongated, it is also necessary to relocate the "Corvette" radiator 52 from its prior art location on the frame 20 in the engine compartment. The radiator is mounted in the elongated engine compartment so that the engine fan spacing relative to the one side of the radiator 52 remains substantially the same as in the prior art location. Thus, the radiator 52 is mounted on a radiator/condenser bracket 60 which is then fastened to the prior art sports car front engine mounts 82 by conventional fastening means. The radiator 52 can be mounted to the sports car front engine mounts 82 since the engine is now mounted on the cross member 80 and the front engine mounts 82 are no longer used to support the engine. Adjacent to the opposite side 53 of the radiator 52 and to the radiator/condenser bracket 60 is mounted a condenser 58 as shown in FIG. 11. The radiator/condenser bracket 60 has a forward downwardly projecting scoop 59 mounted near the bottom 55 of the radiator. The scoop 59 extends between the two forward sections 76 of the frame 20 at the engine compartment 70. The scoop 59 is provided to increase the volume of air through the radiator and for carburetor air for the engine. An air duct 56 is mounted adjacent to the top 54 of the radiator. The air duct 56 is connected to the engine carburetor so as to direct a volume of air required for the proper operation of the engine carburetor. Ahead of the head of the condenser 58 are located a pair of fender support brackets 2. The fender support brackets 2 are mounted to the horizontal front cross frame member 16 as is shown in FIG. 9.

Figure 12:
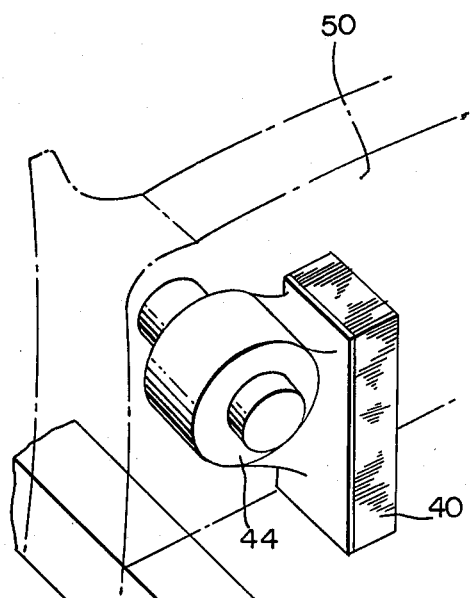
FIG. 12 is a perspective view of the prior art air conditioning system mounted to the fire wall of the prior art sports car.
Figure 13:
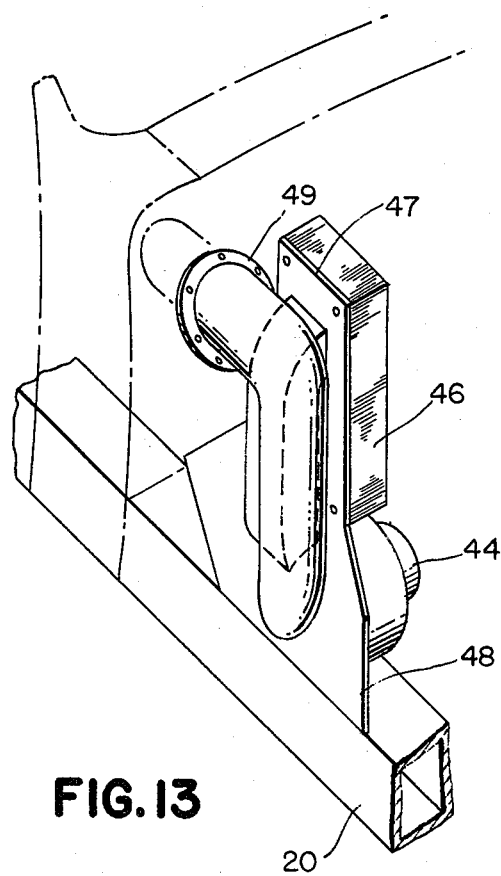
FIG. 13 is a perspective view of the modified air conditioning system mounted to the fire wall and frame in accordance with the present invention.

It has been found that extensive modifications are required to be made to the prior art air conditioning system shown in FIG. 12 to form the vintage car. The blower motor 44 is removed from the air conditioning evaporator core 46 in the prior art sports car. The blower motor 44 is then attached to a combined mounting plate and air conditioning duct 48 which at one end 49 connects to the existing vehicle heating/cooling duct at the firewall and at the other end 47 mounts to the evaporator core 46. The blower motor 44 is located below the evaporator core 46 and above the left hand side of the engine compartment above the frame 20 as is shown in FIG. 13.

Figure 14:
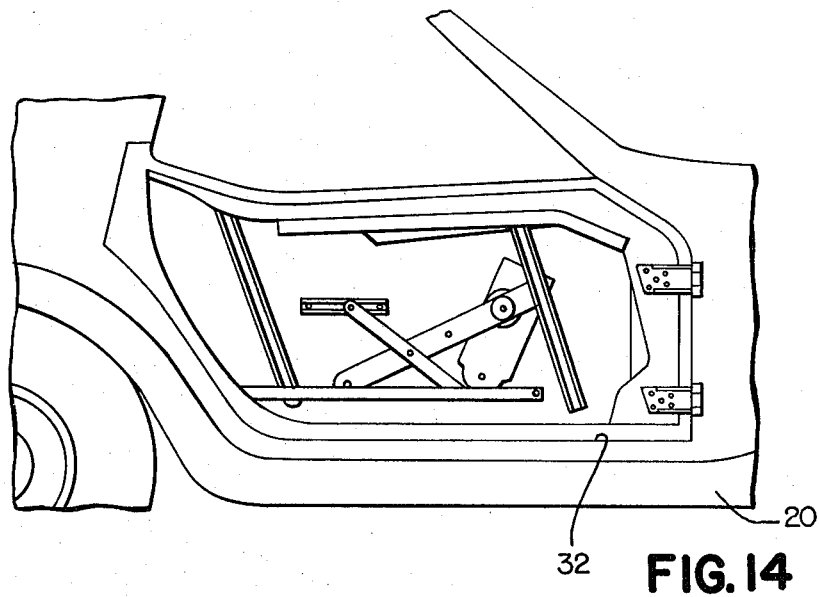
FIG. 14 is a side view of the door with the outer door panel broken away for clarity.
Figure 15:
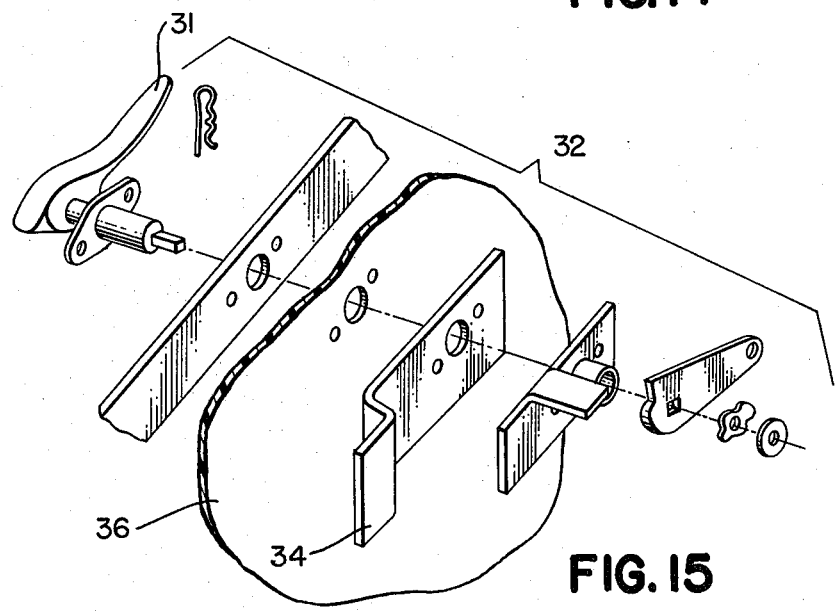
FIG. 15 is an exploded view of the door handle and associated parts in accordance with the present invention.
Figure 16:
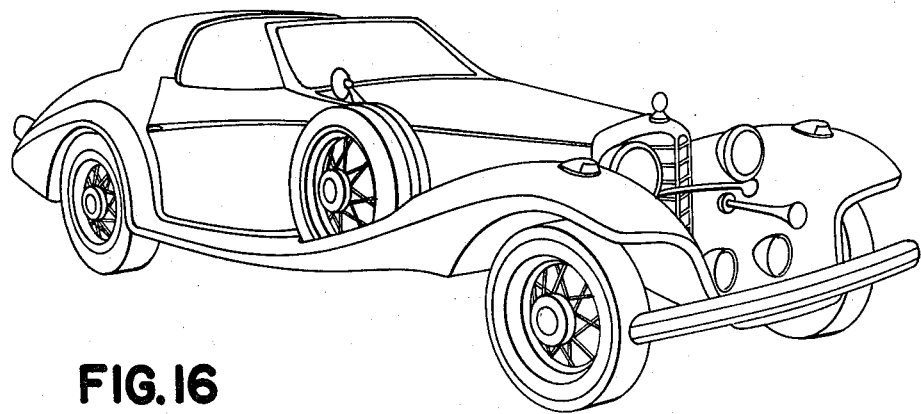
FIG. 16 is a perspective view of the finished vintage car reproduction according to the preferred embodiment.

The existing outer door panels, inner door panels, locks, and handle are removed from the door 32 as is shown in FIG. 14. A reinforcing door beam 34 is mounted in the door 32 as is shown in FIG. 15. The reproduction of a vintage outer door panel 36 and the prior art sports car inner door panels are mounted to the door 32 by conventional means. A door handle assembly 31 is attached to the door and operatively engages the door mechanism of the prior art sports car. The door handle is a modified reproduction of a vintage door handle. In the preferred embodiment, the preferred door handle assembly includes a 1934 Ford door handle although other similar door handles could be used in practicing my invention.

Figure 17:
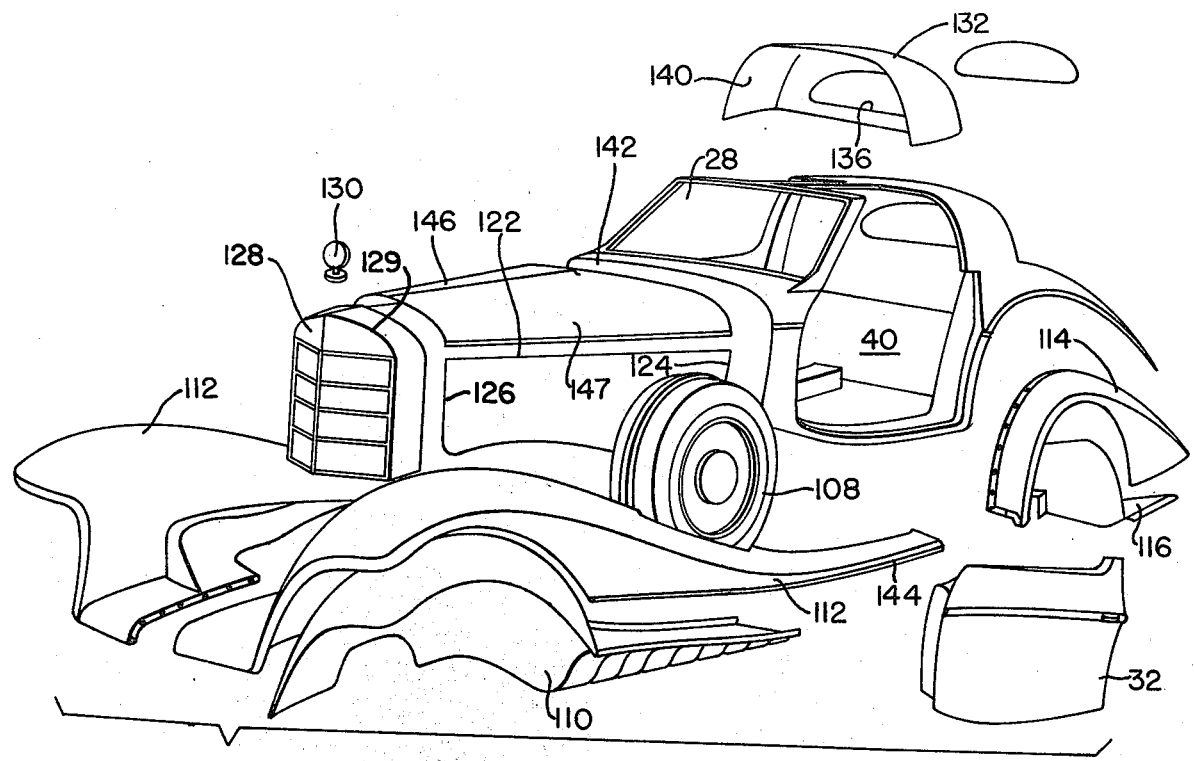
FIG. 17 is an exploded perspective view of FIG. 16 showing the vintage reproduction body parts only.
Figure 18:
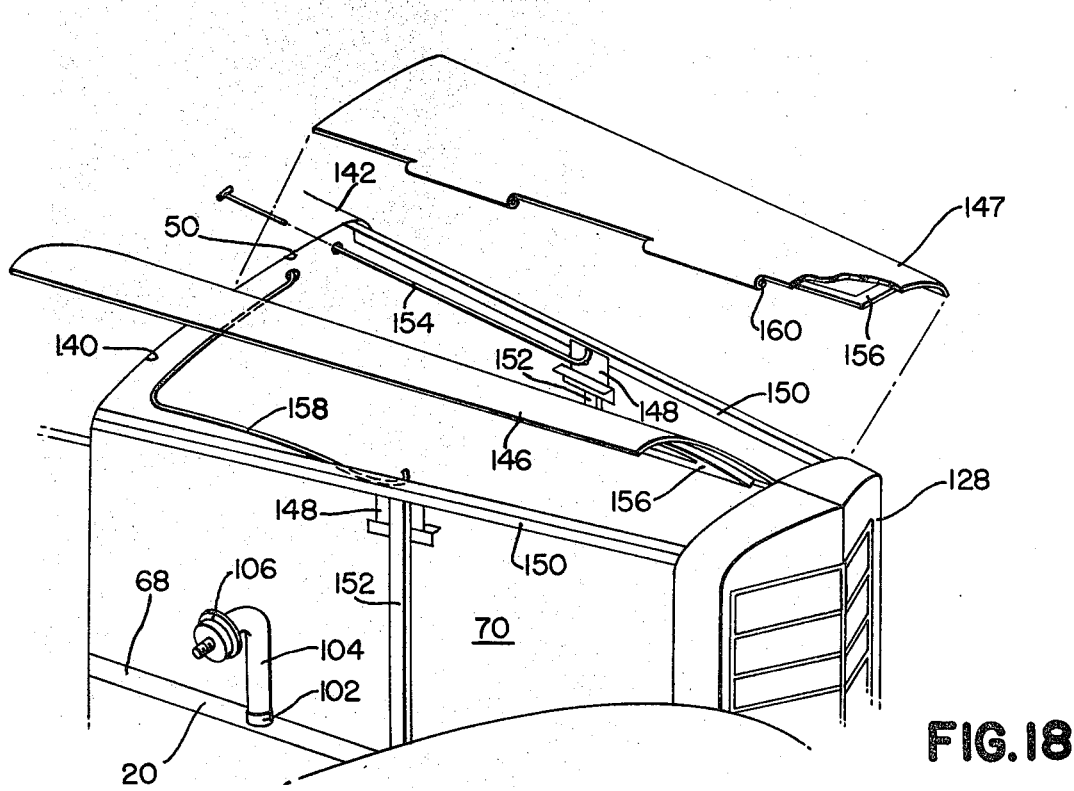
FIG. 18 is a partial perspective view of the hood supports, an elongated hood, an inner reinforcement hood and the spare tire mounting bracket attached to the frame of the car according to the preferred embodiment.

Next, the front fender/splash panels 110 are attached to the frame 20, one on each side, adjacent to the front wheels (only one shown in FIG. 17). A tube 102 is welded to the frame 20 with its major axis vertical to the frame 20 as is shown in FIG. 18. The tube is mounted to the frame so as to be adjacent but spaced away from the front wheels with one tube mounted to the right hand side 68 of the engine compartment and another tube 102 mounted to the left hand side 66 of the engine compartment 70. An L-shaped tube 102 with machined plates 106 is bolted to the tube 104. The L-shaped tube 104 is connected to the tube 102 by a suitable means such as by cotter pin in aligned holes or by any other convenient conventional fastener means. The purpose of the L-shaped tube 104 and the tube 102 will be discussed later on herein.

As shown in FIG. 17, the reproduction of vintage automobile front fenders 112 are mounted on each side of the vehicle to the front fender support brackets 2 and also to the frame 20 by conventional fastener means such as screws and threaded nuts and bolts. The rear fender splash panels 116 are also mounted to the frame 20 around the rear wheels. The rear fenders 114 are mounted to frame 20 around the rear fender splash panels 116.

Both prior art sports car hood latches 148 are removed from the firewall 50 and are mounted onto the hood supports 150 and the hood upright supports 152 on both the left hand side and right hand side of the engine compartment 70 as shown in FIG. 18. The hood supports 150 extend longitudinally from the firewall 50 near the front edge 140 of the cowl assembly 142 to the grille assembly 128. The hood upright supports extend vertically from the frame 20 to the hood supports 150 and provide structural support to the hood supports 150 and the hood latches 148. A release cable 154 is attached to one end to the prior art hood release handle located inside the passenger compartment near the steering wheel. The release cable 154 extends through the firewall 50 and is connected at the other end to a hood latch 148 mounted on the left hand side 66 of the engine compartment 70. Similarly, a hood release cable 156 is connected at the other end to a hood latch 148 on the right hand side 68 of the engine compartment 70. The hood release cable 156 is connected at the one end to a hood release handle mounted on the right hand side of the passenger compartment.

The top hood includes a right hand side top hood panel 146 and a left hand side top hood panel 147. The right hand side and the left hand side top hood panels 146, 147 are joined together at a center hinge member 160 which extends from the cowl assembly 142 to the grille assembly 128 and is secured to each by suitable fastener means. Thus, the top hood provides two access ports into the engine compartment 70. The right hand side top hood panel is secured to the hood support on the right hand side 68 of the engine compartment by a hood latch 148. Similarly, the left hand side top hood panel is secured to the hood support on the left hand side 66 of the engine compartment by a hood latch 148. Each top hood panel is thus separately released by actuating the corresponding hood release handle. The left hand and right hand top hood panels may be removed entirely from the car by unfastening the fastener means at the cowl assembly and the grille assembly.

The hood side panels 122 are mounted to the firewall 50 at one side 124, one on each side of the frame. At the other side 126, the hood side panel 122 is mounted to the condenser/radiator mounting bracket 60 (figure 11) adjacent the grill assembly 128. The one adjacent side of the hood side panel 122 is mounted to the front fender and the other adjacent side of the hood side panel is mounted to the hood support 150. The grille assembly 128 is mounted over the condenser 58 to provide a facsimile of a vintage sports car grille assembly. A suitable hood ornament 130 is mounted to the top 129 of the grille assembly 128 further enhancing the vintage classic car look of the grille assembly.

Returning back to FIG. 17, a rear cap body panel 132 is mounted to the frame 20 and to the rear fenders 114. The rear cap body panel 132 has a window mounted in an aperture 136. The inside 140 of the rear cap body panel 132 forms a part of the passenger compartment 40 as is shown in FIG. 17. In the passenger compartment 40, a headliner is mounted to the inside 140 of the rear cap member.

A cow panel assembly 142 is mounted to the windshield 28 as is shown in FIG. 17. A rocker panel 144 is mounted to the frame 20 adjacent to the front fender 112 and to the passenger compartment 40. A spare tire 108 is mounted to each of the L-shaped tubes 104, previously described, by means of bolts and machine plates 106 thereby sandwiching the tires between the machine plates and the L-shaped tubes. Thus, the tires are securely fastened to the vehicle. An inner hood support member 158 is mounted in the engine compartment adjacent to the right hand side top hood panel 146 as shown in FIG. 17.

A pair of inner hood reinforcing members 156 are fastened to the inner surface of each respective top hood panel by conventional means such as lamination and adhesives. The inner hood reinforcing members 156 are preferably made of fiberglass or any other suitable material. The inner hood reinforcing members 156 provide structural support to each respective top hood panel as well as muffle the noise emitted by the engine compartment components. A rod (not shown) is provided to hold each top hood in place when the top hood panels are opened to permit access to the engine compartment.

The front bumper is attached to the front bumper shock tubes and the rear bumper is mounted to the rear bumper shock tubes.

Finally, the vehicle is painted to the desired color and then all the decorative trim, moldings, original seats, vintage style wheels and tires, are mounted to the car and all necessary appointments attached to the car so as to convert the sports car to a vintage reproduction car.

Befor the car is shipped to the prospective customer, all electrical wiring circuits are checked, the air conditioning system is charged and tested, the front and rear suspension components are checked and aligned, and a final quality audit of the rework process is made. After that, a road test of the vintage car reproduction is made to assure that the vehicle is ready for customer delivery.

Those skilled in the art will recognize that the invention as herein described is not limited in its application to the details of the particular embodiment shown, since the invention is capable of being practiced with other embodiments. Also, the terminology used herein is for the purpose of description and not of limitation. On the contrary, the explanation herein provided is intended to cover all alternatives, modifications and equivalents as may be included within the spirit and scope of the invention as defined by the appended claims.

What is claimed is:

1. A method of converting a production car to to provide a lengthened engine compartment and a lengthened wheelbase to form a vintage car which comprises the steps of:
    removing the engine compartment hood, front and rear fenders, and the front and rear body sections from the frame of said production car;
    severing the frame transversely at the engine compartment and longitudinally separating the severed rear and front sections of the frame thereat;
    inserting two longitudinal frame segments between the separated sections of the frame at the engine compartment and joining each of said inserted longitudinal frame segments at each end to the adjoining sections of the frame;
    fastening a cross member in the engine compartment so as to extend from one inserted frame segment to the other inserted frame segment;
    mounting the engine on said cross member between said at least two longitudinal frame segments; and
    attaching an elongated engine compartment top hood, rear and front fenders, windshield cowl, grille, vintage style wheels and a vintage style outer body to the frame of said production car.

2. A method according to claim 1, wherein said production car has an air conditioner unit including an air conditioner condenser, said method further comprising the steps of:
    relocating the radiator to mount to the frame adjacent to the engine in predetermined spaced relationship to the fan of the engine; and
    mounting the air conditioning condenser adjacent to the radiator so that the radiator is mounted between the fan of the engine and the condenser.

3. A method according to claim 2 wherein said production car has an exhaust emission canister and a windshield washer system including a windshield washer bottle, said method further comprising the steps of:
relocating the exhaust emission canister to mount on the left hand side of the engine compartment on one of the at least two longitudinal frame segments; and
relocating the windshield washer bottle to mount on the right hand side of the frame between the exhaust emission canister and the firewall.

4. A method according to claim 3, further comprising the steps of:
mounting a cowl panel assembly on the windshield;
installing at least two hood supports, one on each side of the engine compartment, so as to extend from the firewall to the radiator and condenser; and
providing at least two vertical supports, one on each side of the engine compartment, so as to extend from the frame to one of the hood supports.

5. A method according to claim 4, further comprising the steps of:
attaching at least two hood side panels, one on each side of the engine compartment, so as to mount to the firewall, radiator and condenser and the hood supports; and
mounting at least two hood latches, one on each side of the engine compartment, onto the hood supports.

6. A method according to claim 5, further comprising the steps of:
connecting at least one underhood release cable at one end to a release handle inside the passenger compartment and at the other end to one of the at least two hood latches to actuate at least one hood latch.

7. A method according to claim 6, further comprising the steps of:
mounting at least one inner support member beneath the engine compartment top hood.

8. A method according to claim 2, further comprising the steps of:
mounting a carburetor air duct on top of the radiator; and
installing an air scoop at the bottom end of the condenser and radiator to deflect air under the frame of the vehicle so as to pass through the condenser and radiator and the carburetor air duct.

9. A method according to claim 1, wherein said production car includes an air conditioning system having a blower motor, a mounting bracket, an evaporator core and an air conditioning duct in the fire wall, said method further comprising the steps of:
removing the blower motor and mounting bracket mounted between the air conditioning evaporator core and the duct in the firewall;
attaching an air conditioning duct to the duct in the firewall and a mounting plate to the air conditioning evaporator core; and
mounting the blower motor on said mounting plate below the evaporator core so as to connect the air conditioning evaporator core with the air conditioning duct.

10. A method according to claim 1, wherein said production car includes a steering column connected to a steering gear box mounted to the frame, said method further comprising after the inserting steps, the step of:
inserting a steering shaft extension and coupling to connect the steering column with the steering gear box mounted on the elongated frame.

11. A method according to claim 1, further comprising the steps of:
removing the existing outer and inner door panels, door locks and handles from the door and installing a reinforcement door beam, a vintage outer door panel, vintage door handle and reinstalling said door locks and inner door panel; and
attaching front and rear fender splash panels to the frame such that the front fender splash panels are proximal to the front wheels and the rear fender splash panels are proximal to the rear wheels.

12. A method according to claim 11, further comprising the steps of:
mounting front fender supports to the horizontal cross member of the frame adjacent to the front wheels.

13. A method according to claim 12, further comprising the steps of:
mounting a pair of front bumper shock tubes to the forward section of the frame;
relocating the rear cross member and gas tank a predetermined depth into the frame of the sports car;
installing a pair of rear bumper shock tubes to said rear cross member; and
attaching a front bumper to said at least one front bumper shock tube and a rear bumper to said at least one rear bumper shock tube.

14. A method according to claim 1, wherein the production car includes a radiator overflow bottle mounted in the engine compartment, said method further comprising the steps of:
relocating the radiator overflow bottle in the engine compartment in the left hand side of the frame.

15. A method of converting a sports car having an air conditioning system including a condenser, evaporator core and blower motor, a radiator overflow bottle, an emissions canister, and speed control located in the engine compartment, to provide a lengthened engine compartment and a lengthened wheelbase to form a vintage car reproduction which comprises the following steps in the order of:
removing the seats, front and rear outer body panels, and the rear bumper shock tubes from the sports car;
trimming the existing mounting flanges;
placing the vehicle on a frame jig;
severing the longitudinal side pieces of the frame which project forward from the firewall into the engine compartment into a forward section and a rear section of the frame thereat;
inserting longitudinal frame segments between the separated sections of the frame at the engine compartment and joining said inserted frame segments at each end to the adjoining sections of the frame;
fastening a cross member in the engine compartment so as to extend from one inserted frame segment to the other inserted frame segment;
mounting the engine on said cross member in the engine compartment;
adding at least two front bumper shock tubes to the forward section of the frame;
relocating the rear cross member and gas tank a predetermined depth into the frame of the sports car;

coupling a steering shaft extension and coupling member to connect the sports car steering gear box with the steering shaft;

attaching a plurality of body spacers to the frame;

relocating the radiator overflow bottle, emission canister, windshield washer bottle and space control in the engine compartment;

connecting the radiator to mount on the frame adjacent to the engine in predetermined spaced relationship to the fan of the engine;

mounting the air conditioning condenser adjacent to the radiator so that the radiator is mounted between the fan of the engine and the condenser;

affixing a carburetor air duct on top of the radiator, said carburetor air duct connected to the engine for ducting air to the carburetor;

installing an air scoop to the bottom of the air conditioning condenser to deflect air from below the frame into the air conditioning condenser and carburetor air duct;

modifying the air conditioning system so that the blower motor is mounted below the air conditioning evaporator;

removing the outer and inner door panels, locks and handle and installing a reinforcing door beam in the door, vintage outer door panels and vintage outer door handles on the door;

appending at least two rear bumper shock tubes to said rear cross member;

attaching vintage front and rear fenders to the frame such that said front fender is proximal the front wheel and said rear fender is proximal the rear wheels; and mounting vintage outer body panels, an elongated top hood, and at least four vintage wheels to the frame.

* * * * *

UNITED STATES PATENT AND TRADEMARK OFFICE
CERTIFICATE OF CORRECTION

PATENT NO. : 4,369,559    Page 1 of 2

DATED : January 25, 1983

INVENTOR(S) : Charles W. Phillips

It is certified that error appears in the above-identified patent and that said Letters Patent is hereby corrected as shown below:

In the Abstract line 2, "asa" should read -- a --.
Column 2, line 34, "principle" should read -- principal --.
Column 3, line 27, "to" second occurrence should read -- with --.
Column 3, line 30, "fire wall" should read -- firewall --.
Column 3, line 33, "fire wall" should read -- firewall --,
Column 4, line 31, "segment" should read -- segments --.
Column 4, line 31, "is" should read -- are --.
Column 5, line 3, "segment" should read -- segments --.
Column 5, line 45, delete the word "opposite".
Column 6, line 47, "102" should read -- 104 --.
Column 6, line 48, "104" first occurrence should read -- 102 --.
Column 7, line 33, "The hood" should read -- As shown in Figure 17, the hood --.
Column 8, line 35, delete "to" second occurrence.
Column 8, line 54, delete "at least".
Column 9, line 7, delete "at least".
Column 10, line 28, delete "said"
Column 10, line 28, insert -- of said -- before "front".
Column 10, line 29, "tube" should read -- tubes --.
Column 10, line 29, delete "said".

UNITED STATES PATENT AND TRADEMARK OFFICE
CERTIFICATE OF CORRECTION

PATENT NO. : 4,369,559        Page 2 of 2

DATED : January 25, 1983

INVENTOR(S) : Charles W. Phillips

It is certified that error appears in the above-identified patent and that said Letters Patent is hereby corrected as shown below:

Column 10, line 30, insert -- of said -- before "rear".

Column 10, line 30, "tube" should read -- tubes --.

Signed and Sealed this

Fourteenth Day of August 1984

[SEAL]

*Attest:*

*Attesting Officer*

GERALD J. MOSSINGHOFF

*Commissioner of Patents and Trademarks*